United States Patent
Bermundo et al.

(10) Patent No.: US 11,853,630 B1
(45) Date of Patent: Dec. 26, 2023

(54) PRINTING DEVICE CONNECTIVITY MANAGER FOR A DIGITAL FRONT END

(71) Applicant: Kyocera Document Solutions Inc., Osaka (JP)

(72) Inventors: Neil-Paul Payoyo Bermundo, Glendora, CA (US); Edwin Philip Lockwood, Brea, CA (US); Yoshihiro Osada, Torrance, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 18/065,845

(22) Filed: Dec. 14, 2022

(51) Int. Cl.
   *G06F 3/12* (2006.01)
(52) U.S. Cl.
   CPC ............ *G06F 3/1288* (2013.01); *G06F 3/122* (2013.01); *G06F 3/1228* (2013.01)
(58) Field of Classification Search
   CPC ....... G06F 3/1288; G06F 3/122; G06F 3/1228
   USPC ...................................................... 358/1.13
   See application file for complete search history.

(56) References Cited

U.S. PATENT DOCUMENTS

| 11,327,701 | B2* | 5/2022 | Himpe | G06F 3/1282 |
| 2008/0170255 | A1* | 7/2008 | Mazur | G06F 3/1243 358/1.18 |
| 2017/0078522 | A1* | 3/2017 | Kogusuri | G06F 11/3495 |

* cited by examiner

*Primary Examiner* — Allen H Nguyen
(74) *Attorney, Agent, or Firm* — MILLEN, WHITE, ZELANO & BRANIGAN, P.C.; William Nixon

(57) ABSTRACT

A printing system includes a digital front end (DFE) system connected to a plurality of printing devices. The DFE system manages printing operations to the plurality of printing devices. The DFE system also includes a printing device connectivity manager to manage connections with the printing devices. Printing connectivity modules are installed at the printing device connectivity manager using application programming interfaces (APIs) that are loaded at the creation of the printing connectivity modules. The APIs allow the printing connectivity modules to interact with the printing devices. The printing connectivity modules can communicate with application modules located at the printing devices.

20 Claims, 9 Drawing Sheets

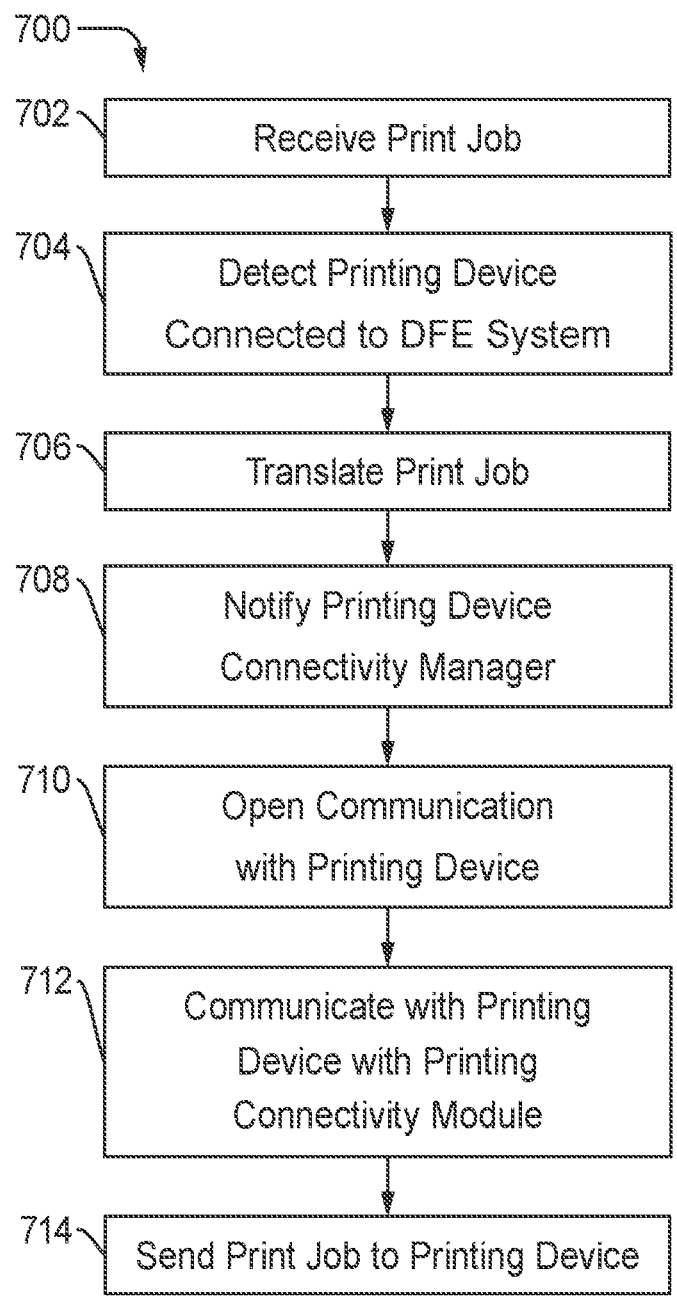

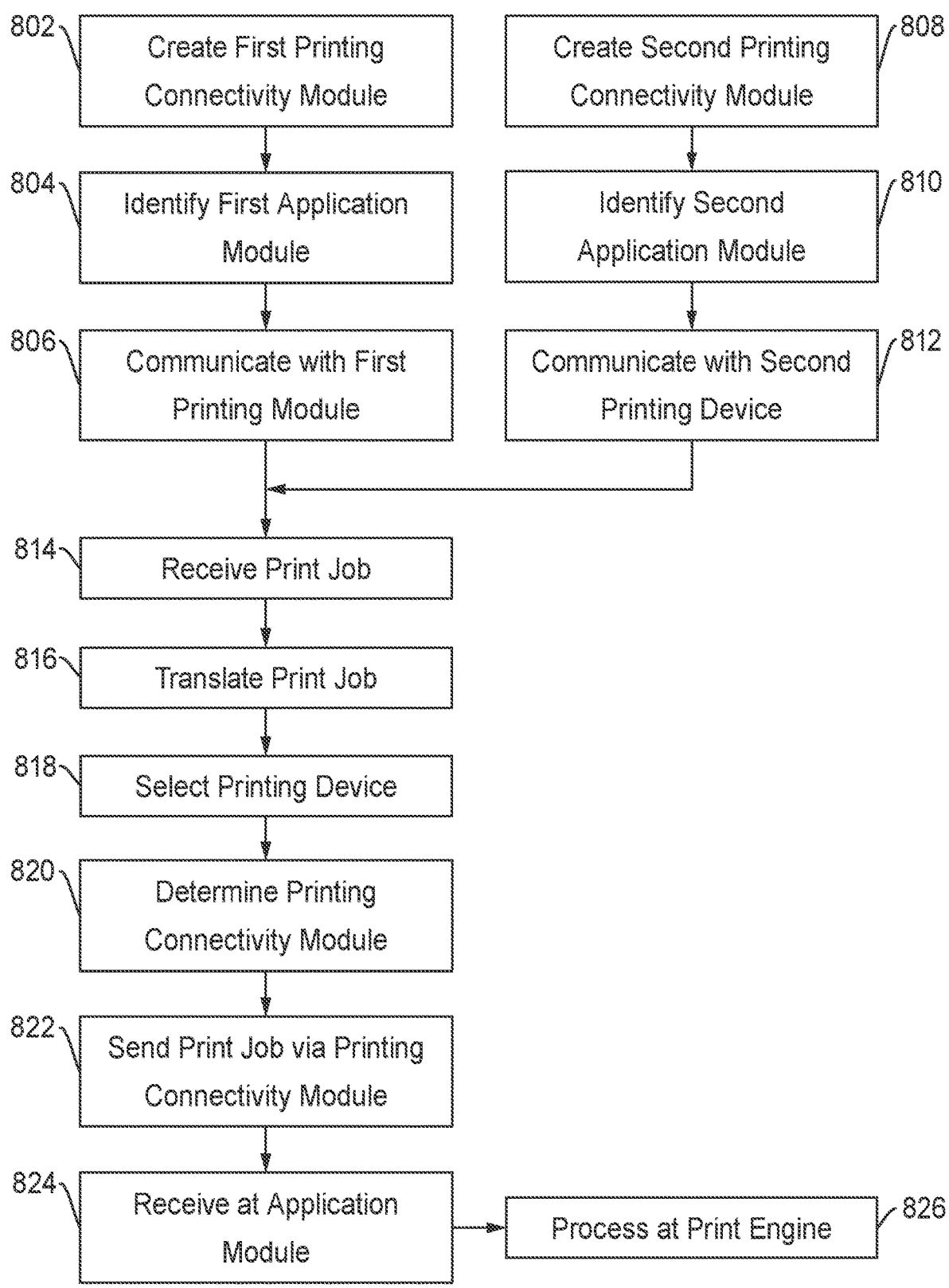

PRINTING DEVICE CONNECTIVITY MANAGER FOR A DIGITAL FRONT END

FIELD OF THE INVENTION

The present invention relates to a printing device connectivity manager to manage workflow between a digital front end and a plurality of printing devices. More particularly, the present invention relates to using printing connectivity modules within the printing device connectivity manager to manage workflow to specific printing devices.

Description of the Related Art

The development of digital front end (DFE) systems involves the design and implementation of the connectivity to printing devices. This feature may be accomplished by adding explicit software implementations that include modification to the DFE software in order to send print jobs to the new printing devices. For example, a DFE may be developed to initially send print jobs to printing devices that are on the network via TCP/IP protocols or using network sockets programming for printing devices with discoverable internet protocol (IP) addresses. This feature also may need information on how the DFE will communicate with the printing device firmware in the printing device itself that is being connected.

Whenever a new printing device is connected to the DFE system, the DFE software code is modified, re-built, or recompiled, and then re-released as a new version of DFE software. This development phase can take a lot of time and resources. It also may cause potential problems with other existing connectivity modules as well as the DFE system itself.

SUMMARY OF THE INVENTION

A method for managing a printing system is disclosed. The method includes enabling a printing device connectivity manager at a digital front end (DFE). The method also includes creating a printing connectivity module in the printing device connected to the DFE. The printing connectivity module corresponds to a printing device connected to the DFE. The method also includes loading a plurality of application programming interfaces (APIs) at the printing device connectivity manager to implement the printing connectivity module. The method also includes installing the plurality of APIs to the printing connectivity module. The plurality of APIs provides interfaces within the printing connectivity module to manage, handle, or transmit a translated print job within the DFE. The method also includes interacting with the printing device from the DFE using the printing connectivity module.

A method for managing workflow within a printing system is disclosed. The method includes detecting a printing device connected to a digital front end (DFE) to be processed at the printing device. The method also includes translating a print job within the DFE to be processed at the printing device. The method also includes notifying, by the DFE, the printing device connectivity manager to open communication with the printing device. The method also includes communicating with the printing device with a printing connectivity module located in the printing device connectivity manager. The printing connectivity module includes a plurality of application programming interfaces (APIs). The method also includes sending the print job to the printing device using at least one of the plurality of APIs within the printing connectivity module corresponding to the printing device.

A digital front end (DFE) is disclosed. The DFE includes a processor. The DFE also includes a memory connected to the processor. The memory stores instructions that, when executed on the processor, configure the DFE to detect a printing device connected to the DFE using a printing device connectivity manager. The instructions also configure the DFE to translate a print job within the DFE to be processed at the printing device. The instructions also configure the DFE to notify the printing device connectivity manager to open communication with the printing device. The instructions also configure the DFE to communicate with the printing device with a printing connectivity module located in the printing device connectivity manager. The printing connectivity module includes a plurality of application programming interfaces (APIs). The instructions also configure the DFE to send the print job to the printing device using at least one of the plurality of APIs within the printing connectivity module corresponding to the printing device.

A method for managing a printing system is disclosed. The method includes creating a first printing connectivity module in a printing device connectivity manager of a digital front end (DFE). The DFE is connected to a plurality of printing devices. The method also includes loading a first plurality of application programming interfaces (APIs) at the printing device connectivity manager to implement the first printing connectivity module to communicate to a first printing device of the plurality of printing devices. The method also includes installing the first plurality of APIs to the first printing connectivity module. The first plurality of APIs provides interface within the first printing connectivity module to manage, handle, or transmit a translated print job within the DFE. The method also includes identifying a first application module at the first printing device. The method also includes communicating with the first application module at the first printing device by the first printing connectivity module of the printing device connectivity manager at the DFE.

A method for managing printing operations within a printing system is disclosed. The method includes translating a print job into a file format at a digital front end (DFE). The DFE is connected to a plurality of printing devices. The method also includes detecting a printing device from the plurality of printing devices. The printing device processes the print job according to the file format. The method also includes determining a printing connectivity module from a plurality of printing connectivity modules within a printing device connectivity manager at the DFE to communicate with the printing device. The printing connectivity module includes a plurality of application programming interfaces (APIs) to interact with the printing device. The method also includes sending the print job to the printing device via the printing connectivity module. The method also includes receiving the print job at the printing device at an application module connected to the printing connectivity module. The method also includes processing the print job by a print engine at the printing device.

A printing system is disclosed. The printing system includes a plurality of printing devices. A printing device of the plurality of printing devices includes an application module. The printing system also includes a digital front end (DFE) connected to the plurality of printing devices. The DFE manages printing operations to the plurality of printing devices. The printing system also includes a printing device connectivity manager of the DFE to manage communications with the plurality of printing devices. The printing system also includes a printing connectivity module of a plurality of printing connectivity modules within the printing device connectivity manager. The printing connectivity module is connected to the application at the printing device. The printing connectivity module includes a plurality of application programming interfaces (APIs) to interact with the printing device. The DFE exchanges information with the printing device via the printing connectivity module.

BRIEF DESCRIPTION OF THE DRAWINGS

Various other features and attendant advantages of the present invention will be more fully appreciated when considered in conjunction with the accompanying drawings.

FIG. 7 illustrates a flowchart for managing workflow using the DFE system and the printing device connectivity manager according to the disclosed embodiments.

FIG. 8 illustrates a flowchart for managing printing operations within the printing system using the DFE system according to the disclosed embodiments.

DETAILED DESCRIPTION OF THE PREFERRED EMBODIMENTS

Figure 1A:
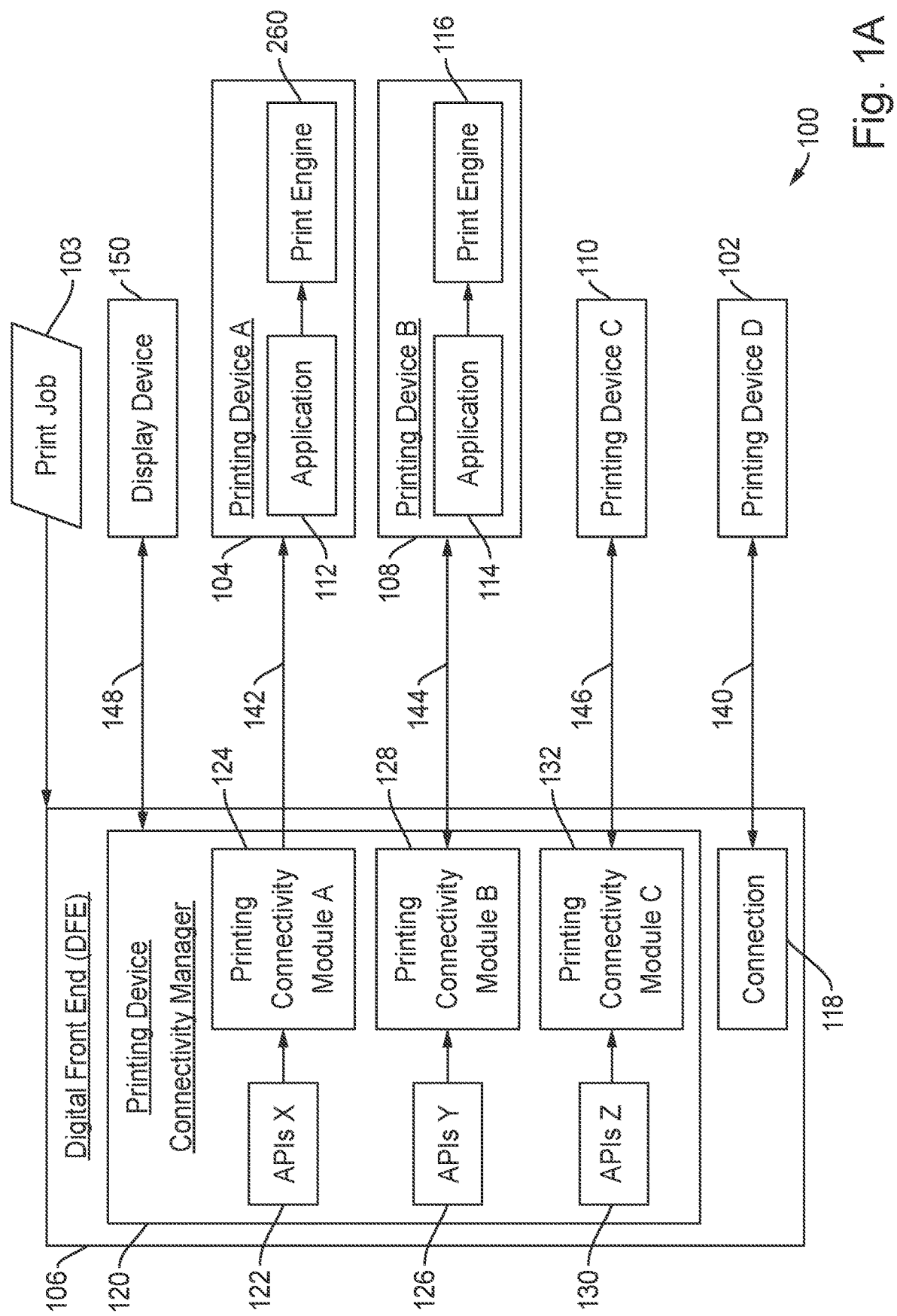
FIG. 1A illustrates a printing system for printing documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

Digital front end, or DFE, may be a system comprising a computer and software that provides services for accepting a print job, such as a PDF file, XJDF print job, image file, or other regular PDL print jobs. The DFE converts the print job to a format that a print engine can receive, process, and print directly. In some instances, a DFE resembles a printing device without actual printing hardware. It may be like printing device firmware that can process print jobs from any source including computer systems and applications. The DFE then sends the translated print jobs to connected printing devices. The DFE may have connectivity with multiple printing devices.

The development of DFE systems involves the design and implementation of the connectivity to the printing devices. In conventional systems, this feature may be accomplished by adding explicit software that includes a modification to the DFE software in order to send print jobs to new printing devices. For example, a DFE may be developed to initially send print jobs to printing devices that are on the network via TCP/IP protocol or using network sockets programming. This method would work on printing devices with known or discoverable IP addresses. It also requires information on how the DFE will communicate with the printing device firmware in the printing device itself that is being connected.

The disclosed embodiments, therefore, include a server DFE system that allows the disclosed embodiments to develop new connectivity modules in optimal time so that the DFE and the printing device can be released to the market faster, thereby satisfying demand for new customers and new services. The disclosed embodiments may reduce or eliminate development time in modifying the main DFE software. The disclosed embodiments also may add connectivity modules with the need to rebuild the DFE software.

According to the disclosed embodiments, connectivity with the printing devices will be abstracted using modules that can be installed on-demand within the DFE system. When installed, the DFE will be able to interact with the corresponding real printing device with the installable module. The disclosed embodiments include a printing device connectivity manager. The printing device connectivity manager includes printing device connectivity application programming interfaces (APIs) and printing connectivity modules.

The printing device connectivity APIs are new components in the DFE that will provide standard or pre-defined interfaces for managing, handling, and transmitting of translated print jobs to any printing device. There may be multiple printing connectivity modules that are installable plug-ins that allow connectivity with any or new printing devices. Such plug-ins may replace hardwired connectivity support for existing or legacy printing devices. Printing device connectivity relates to communication support between the DFE and printing devices. Communication is accomplished via network programming using TCP/IP or network sockets as well as other, newer technologies, such as direct USB connection, parallel port, Bluetooth™, near-field communication (NFC), direct Wi-Fi, direct LAN cable connectivity, and the like. Some of the communication channels are non-standard for printing and would need the disclosed DFE system to become available for printing operations.

The printing device connectivity manager is a new DFE component that will manage various new connections to printing devices that will be realized through the disclosed embodiments, through printing connectivity modules. This component may allow the DFE to dynamically interact with various printing devices. The printing device connectivity manager maintains and manages the list of printing device connections, and identifies the connection which the DFE is intending to interact. The printing device connectivity manager then facilitates connection and communication with the selected printing device.

The printing device connectivity manager may comprise the following sub-components of printing connectivity APIs and printing connectivity modules. Printing connectivity APIs include pre-defined interface functions, or APIs, for managing, handling, and transmitting of translated print jobs to any printing device. Printing connectivity modules may be an installable plug-in that can be developed independently of the DFE system. Printing connectivity modules allow for actual connectivity with the physical printing devices via any networking or communication channel, such as TCP/IP, Bluetooth™, NFC, and the like. There may be multiple printing connectivity modules that are installable plug-ins that allow connectivity with existing or new printing devices. One module may connect to a printing device via any of the following: direct USB connection, Bluetooth™, NFC, direct LAN cable, direct Wi-Fi, small computer system interface (SCSI), parallel port, serial or future technologies that allow computers or printing devices to be connected either wirelessly or wired.

Each printing connectivity module implements and provides the APIs identified in the printing connectivity APIs component in the DFE. This feature may be accomplished when the printing connectivity module plug-in includes a dynamic link library (DLL) or a module that can be loaded at run-time in the DFE system. Further, the printing connectivity module may provide a header file, if necessary, to facilitate integration of the connectivity module with the DFE system. In some embodiments, the connectivity module may not need to have a header file as the connectivity module can be installed into the DFE system using standard installer programs.

The plug-in feature of printing connectivity modules may be developed to add functionality such as performing the actual translation from legacy raster data format to new raster data format. Thus, to add new capabilities to the DFE, these actions may occur in the printing connectivity module.

This feature also may be an application on non-DFE products, such as office printing devices or other machines that send digital data to other machines for processing, displaying, reviewing, or storage, wherein the digital data may need to be encoded or decoded, compressed or decompressed, or translated from one format to another.

The printing device connectivity manager works with the DFE to improve printing operations workflow within the printing system. The DFE software detects printing devices through the printing device connectivity manager. In some embodiments, the printing device connectivity manager provides a list of printing devices detected or obtained through the installed printing connectivity modules. The DFE allows a user or administrator to select a printing device to which to interact. The DFE notifies the printing device connectivity manager about the selected printing device. The DFE uses printing connectivity APIs to interact, retrieve data, or send data with the selected printing device.

Thus, according to the disclosed embodiments, the disclosed DFE system may be developed independently of connectivity with printing devices. Printing connectivity modules may be developed independently of the DFE system. The DFE system can have abstract views of new printing devices, as well as having the capability to interact or communicate with new printing devices through the printing device connectivity manager, specifically through the printing connectivity modules. According to the disclosed embodiments, there is no need to modify the DFE system software as the printing connectivity modules may be installed even after deployment to all the DFE system to print to new or previously unsupported printing device or other devices within the printing system.

FIG. 1A depicts a printing system 100 for printing documents according to the disclosed embodiments. Printing system 100 includes DFE system 106. DFE system 106 is connected to printing devices 102, 104, 108, and 110. DFE system 106 may receive one or more print jobs 103, convert the print job to a file format useable at a printing device, and then forward the print job to the selected printing device. One advantage of this configuration is that processing of print jobs may be offloaded to DFE system 106 to keep resources at the printing devices from being tied up with complex computer operations. DFE system 106 may use graphic processing units to enable more complex processing and translation of print jobs. Further, an update to print processing software or firmware may occur at DFE system 106 as opposed to each printing device within printing system 100, thereby making upgrades easier and less time consuming.

DFE system 106 includes connection module 118 to printing device D 102. Connection module 118 includes information on how DFE system 106 communicates with the printing device firmware in printing device D 102. Connection module 118 may use conventional features to achieve this connection and to send print jobs to printing device D 102. Connection 140 connects printing device D 102 with connection module 118.

DFE system 106 also includes printing device connectivity manager 120. The features of printing device connectivity manager 120 are disclosed above. Printing device connectivity manager 120 provides connectivity to printing devices using plug-in modules that may be installed on-demand. When installed, DFE system 106 may interact with the connected or coupled printing devices using printing device connectivity manager 120.

Printing device connectivity manager 120 includes printing connectivity modules 124, 128, and 132. Printing connectivity modules include the features disclosed above. Each printing connectivity module is connected or coupled to a printing device. Thus, printing connectivity module A 124 is connected using connection 142 to printing device A 104. Printing connectivity module B 128 is connected using connection 144 to printing device B 108. Printing connectivity module C 132 is connected using connection 146 to printing device C 110. Printing system 100 may implement connections 142-146 via network programming using TCP/IP or network sockets. Connections 142-146 also may implement technologies such as a direct universal serial bus (USB) connection, a parallel port, Bluetooth™, NFC, direct Wi-Fi, direct local area network (LAN) connectivity and the like. These communication channels may not be standard for printing operations but are made available for printing according to the disclosed embodiments.

When DFE system 106 wants to communicate with a specific printing device, it uses printing device connectivity manager 120 to determine which corresponding printing connectivity module to use. For example, if print job 103 is meant for printing device B 108, then DFE system 106 will use printing connectivity module B 128 to interact with printing device B 108. Printing connectivity module B 128 also may retrieve information from printing device B 108 when requested by DFE system 106.

Printing connectivity modules of printing device connectivity manager 120 may be installable plug-ins that allow connectivity with printing devices. Printing connectivity modules even may replace hardwired connectivity support, such as connection 118, for legacy printing devices. A printing connectivity module is implemented using printing connectivity APIs. Printing connectivity APIs provide standard or pre-defined interfaces for managing, handling, and transmitting information and data between the printing connectivity modules and the printing devices. Printing connectivity APIs are disclosed in greater detail below.

Each printing connectivity module implements its own plurality of APIs. Thus, printing connectivity module A 124 implements and provides APIs X 122. Printing connectivity module B 128 implements and provides APIs Y 126. Printing connectivity module C 132 implements and provides APIs Z 130. APIs X 122 provide the functionality for printing connectivity module A 124 to communicate with printing device A 104. APIs Y 126 provide the functionality for printing connectivity module B 128 to communicate with printing device B 108. APIs Z 130 provide the functionality for printing connectivity module C 132 to communicate with printing device C 110.

According to the disclosed embodiments, the printing connectivity modules may communicate directly to application modules at the respective printing devices. Use of application modules allow DFE system 106 to bypass the DFE of the printing device and provide translated print jobs 103 to the print engine of the printing device. This feature helps to offload processing from the printing devices to DFE system 106.

Thus, as shown in FIG. 1A, printing device A 104 includes application module 112. Application module 112 is configured to communicate directly with printing connectivity module A 124 of printing device connectivity manager 120. Application module 112 also may provide files for printing directly to print engine 260 of printing device A 104. As the files for print jobs 103 are provided already converted into a file format ready for printing, the disclosed embodiments may provide the print job directly to the print engine for printing. Printing device B 108 includes application module 114 that communicates with printing connectivity module B 128 to receive print jobs 103 for print engine 116 of printing device B 108. Printing device C 110 also may include an application module and a print engine even though these features are not shown.

Using printing device connectivity manager 120, DFE system 106 may communicate directly with printing devices within printing system 100. Additional printing connectivity modules may be added to printing device connectivity manager 120 as printing devices are added to printing system 100. Printing device connectivity manager 120 creates the printing connectivity module using the associated APIs. DFE software does not need to be modified. Further, printing connectivity modules may be removed if a printing device is removed.

Printing system 100 also may include a display device 150. Display device 150 may be a computer, tablet, smartphone, kiosk, display screen, and the like that allows a user to review a print job prior to sending it to a selected printing device. Printing device connectivity manager 120 may forward the converted print job to display device 150, where it is displayed on a screen for an operator to review. This feature may allow the operator to review and check the print job prior to printing operations. This feature also is different from a "print preview" feature available using print drivers. The data within the document to be printed has not yet been rendered. Display device 150 is connected to printing device connectivity manager 120 by connection 148. In some embodiments, display device 150 may be with a printing device. In other embodiments, it is a separate device such that the operator does not need to be in the print shop to review.

DFE system 106 may implement graphics processing units, or graphics cards, to process print jobs prior to them being sent to the printing devices. DFE system 106 provides good color matching capabilities on consistent basis. Using the printing connectivity modules, DFE system 106 may provide print jobs directly to the print engines of the printing devices. Further, DFE system 106 may retrieve data from printing devices using the printing connectivity modules, such as ink use, tray usage, configuration settings, and the like. The APIs of the printing connectivity modules import information to enable direct translation of print jobs.

Figure 1B:
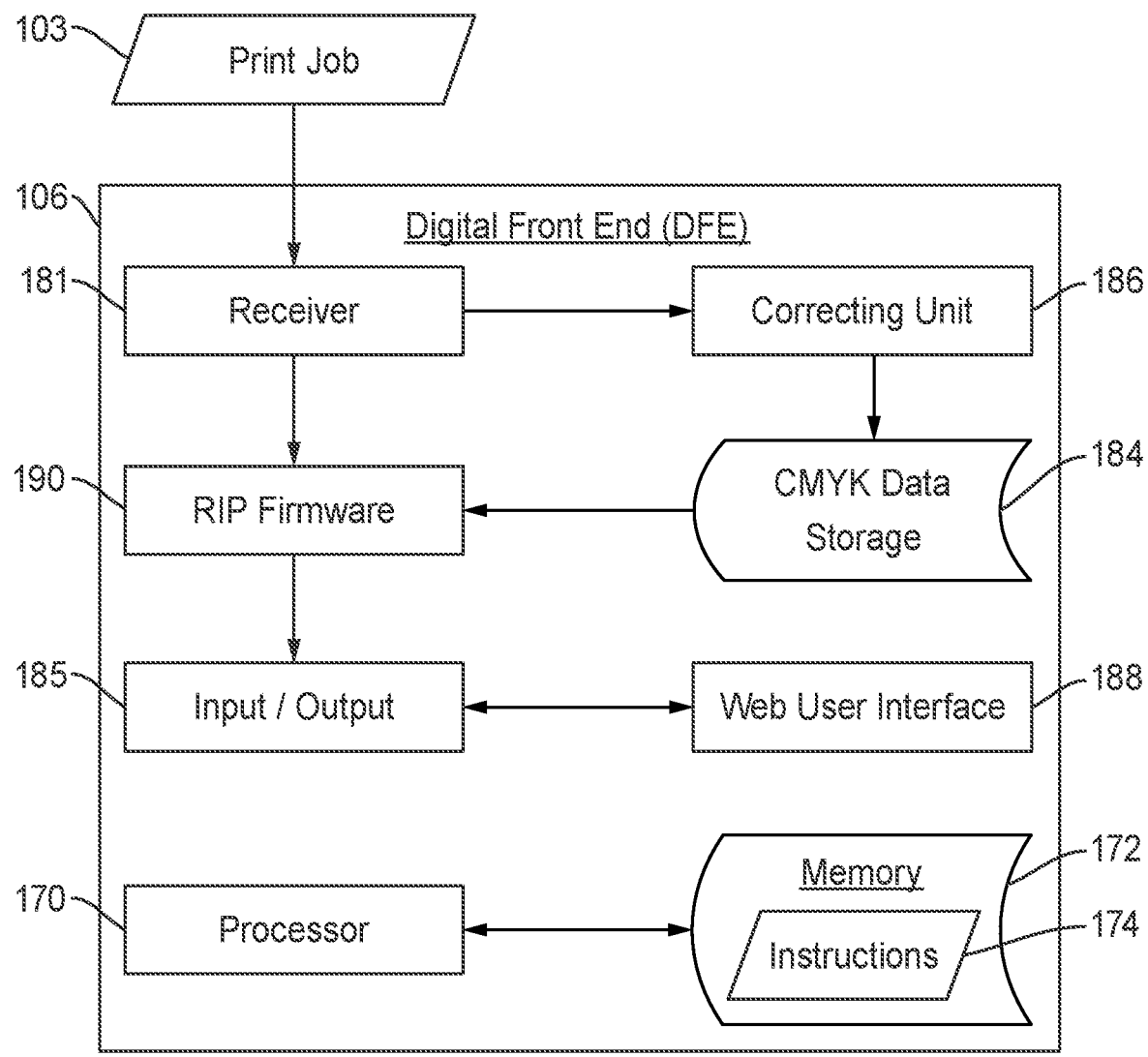
FIG. 1B illustrates a digital front end (DFE) for a printing device according to the disclosed embodiments.

FIG. 1B depicts a block diagram of DFE system 106 according to the disclosed embodiments. DFE system 106 includes a receiver 181, an RIP firmware 190, a CMYK data storage 184, an input/output connector 185, and a correcting unit 186. Additional components within DFE system 106 may be implemented, including printing device connectivity manager 120 disclosed in FIG. 1A.

Receiver 181 receives print job 103 received within system 100 and outputs the print job to RIP firmware 190. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 190 converts image data associated with the print job into raster data to thereby generate rendering data, and outputs the generated rendering data. RIP firmware 190 also converts the rendering data into rendering data in a CMYK format. When the rendering data is originally in the CMYK format, or CMYK rendering data, the conversion may not be performed. RIP firmware 190 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 190 may be transmitted within printing system 100 via input/output connector 185. The print condition information and the print medium type, as well as the rendering data, may be transmitted to a selected printing device within printing system 100. As disclosed above, the rendered data may be in a file format acceptable for a printing device such that the print job is provided directly to the print engine of the printing device.

DFE system 106 also includes web user interface 188 that may communicate with other devices within printing system 100, if it is located at a separate device, using, for example, input/output connector 185. Web user interface 188, or web application, allows a user of the DFEs of other printing devices to interact with content or software running on DFE system 106.

DFE system 106 also includes one or more processors 170. Processors 170 may execute code in the form of instructions 174 stored in memory 172 connected to the one or more processors. As disclosed above, processors 170 may be computer processing units (CPUs) or graphics processing units (GPUs). Processors 170 may be scalable in that DFE system 106 may increase its processing capabilities to meet increasing demands within printing system 100. Instructions 174 configure DFE system 106 to perform various tasks related to creation and implementing printing device connectivity manager 120. For example, instructions 174 may instruct processors 170 to dedicates a processor to perform the functions of printing device connectivity manager 120.

Figure 2:
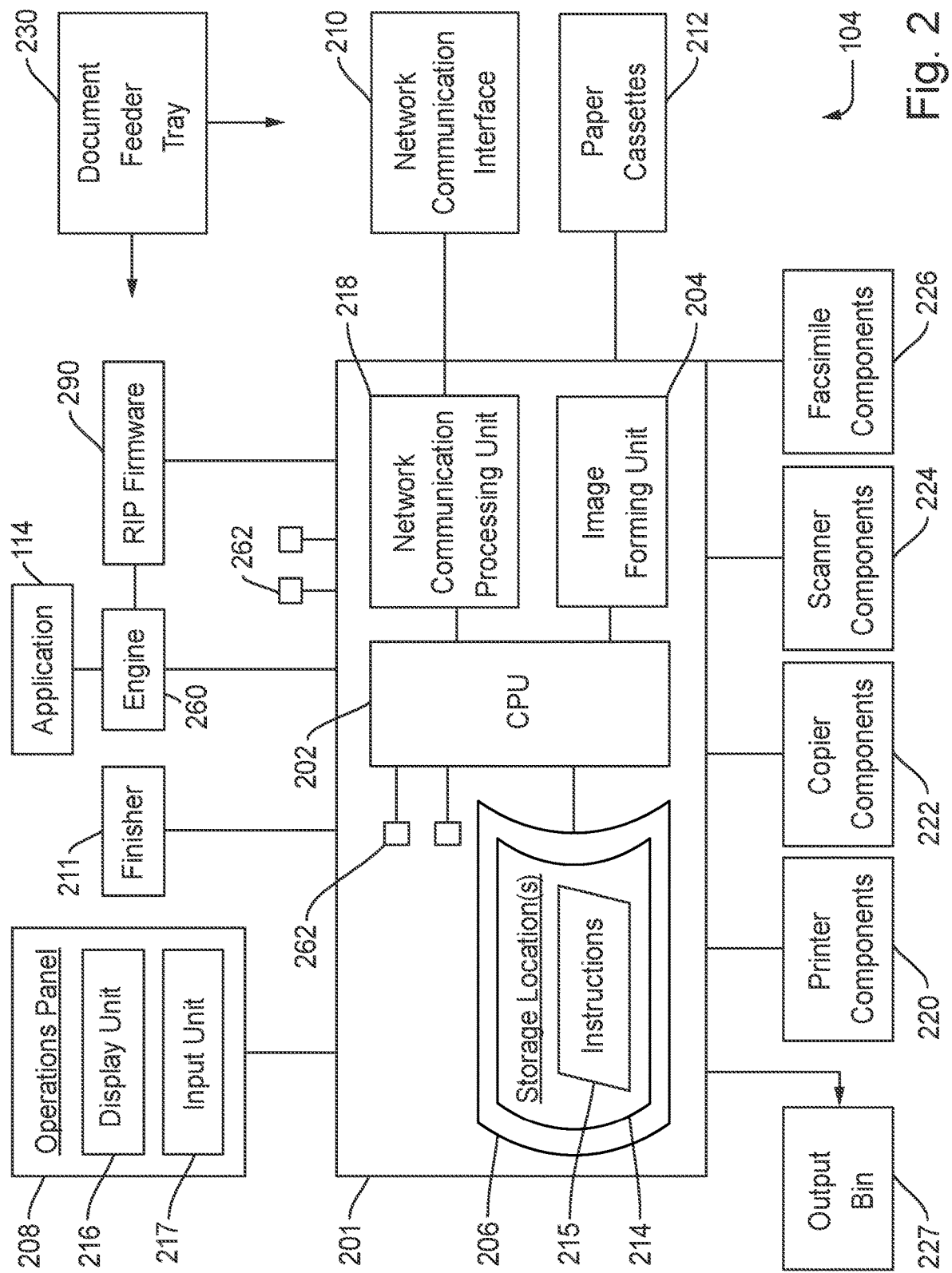
FIG. 2 illustrates a block diagram of components of the printing device for use within the printing system according to the disclosed embodiments.

FIG. 2 depicts a block diagram of components of printing device A, or just printing device, 104 according to the disclosed embodiments. The architecture shown in FIG. 2 may apply to any multi-functional printing device or image forming apparatus that performs various functions, such as printing, scanning, storing, copying, and the like within system 100. As disclosed above, printing device A 104 may send and receive data from DFE system 106 using printing connectivity module A 124, if a separate device, and other devices within system 100.

Printing device A 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device A 104, using computing platform 201, may be configured to perform various operations, such as scanning, copying, printing, receiving or sending a facsimile, or document processing. As such, printing device A 104 may be a printing device or a multi-function peripheral including a scanner, and one or more functions of a copier, a facsimile device, and a printer. To provide these functions, printing device A 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device A 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays. Paper cassettes 212 may include papers having various sizes, colors, composition, and the like. Papers or media within paper cassettes 212 may be considered "loaded" onto printing device A 104. The information for printing these papers may be captured in a paper catalog stored at DFE system 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device A 104 to receive papers and documents to be processed. Feeder tray also may refer to one or more input trays for printing device A 104. A document is placed on or in document processor input feeder tray 230, which moves the document to other components within printing device A 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device A 104. For example, a storage location 214 may include data for running an operating system executed by computing platform 201 to support the components within printing device A 104. According to the disclosed embodiments, memory unit 206 may store the tokens and codes used in performing the deferral operations for printing device A 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device A 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device A 104.

Display unit 216 also may serve as to display results from DFE system 106, if applicable. DFE system 106 may send calibration and paper catalog information to printing device A 104 for display. For example, the operator at DFE system 106 may send a calibration to printing device A 104. Printing device A 104 displays paper type and any other information needed to complete the calibration.

Printing device A 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device A 104.

Printing device A 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device A 104.

Printing device A 104 may include one or more sensors 262 that collect data and information to provide to computing platform 201 or CPU 202. Each sensor 262 may be used to monitor certain operating conditions of printing device A 104. Sensors 262 may be used to indicate a location of a paper jam, failure of hardware or software components, broken parts, operating system problems, document missfeed, toner level, as well as other operating conditions. Sensors 262 also may detect the number of pages printed or processed by printing device A 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device A 104 communicates with other devices within system 100 via network communication interface 210 by utilizing a network protocol, such as the ones listed above. In some embodiments, printing device A 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device A 104 submits and receives data from DFE system 106 as well as other devices within system 100.

Figure 3:
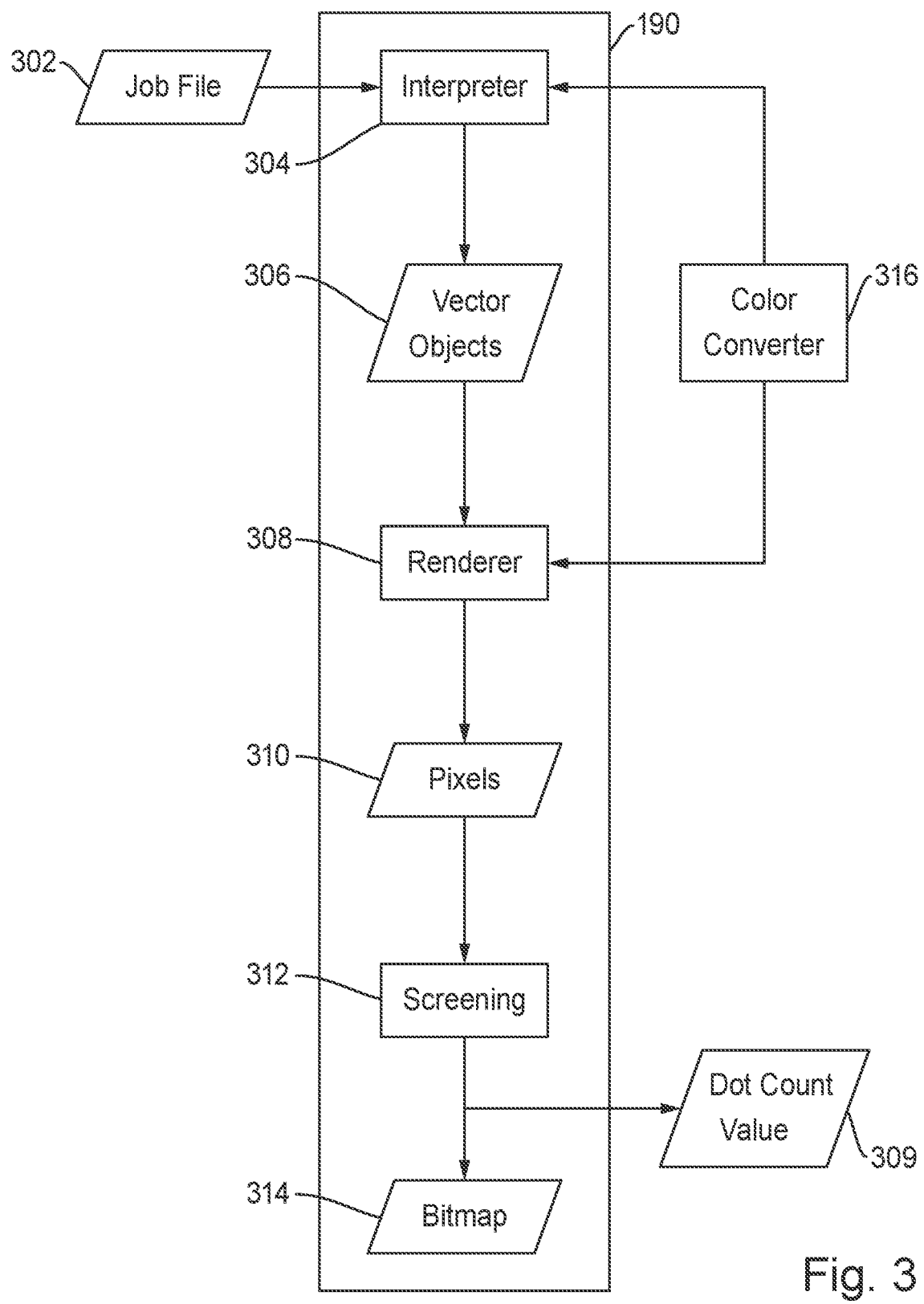
FIG. 3 illustrates a block diagram of the RIP firmware used within the DFE system according to the disclosed embodiments.

FIG. 3 depicts a block diagram of RIP firmware 190 used within DFE system 106 according to the disclosed embodiments. RIP firmware 190 converts text and image data from different file formats including PDF, TIFF, or JPEG into a format that the printing devices can understand. The process of raster image processing a page implements several steps to be performed, regardless whether the page is submitted as PostScript, PDF, or any other page description language (PDL). In short, RIP firmware 190 may provide interpretation, rasterization, and screening.

Job file 302 may be a job file associated with print job 103. Job file 302 may be a PostScript file in code. Job file 302 may be provided to RIP firmware 190 in DFE system 106 to convert its code into raster or bitmap code. Job file 302 is received at interpreter 304, which interprets the commands in the code to redraw the object and elements of a page as vector objects 306. The PDL of job file 302 is read and decoded into graphical elements to be placed on a sheet. Each element may be an image, a character of text, a fill, stroke, and the like or listed in vector objects 306.

Renderer 308 processes vector objects 306 to convert every graphical element into the appropriate pattern of pixels to form the output raster. The resolution independent vector objects are converted into pixels 310. Screening 312 takes the raster image of pixels 310 to form individually screened cyan, magenta, yellow, and black separations. These are halftone dots in the form of a bitmap 314 consisting of commands that can be understood by a print engine at a printing device, such print engine 260 of printing device A 104.

RIP firmware 190 also may implement color converter 316. Color converter 316 may implement the functions disclosed above with regard to color conversion. Color converter 316 provides color management and calibration. These actions may be applied during interpretation or rendering, depending on configuration and job content. Color printing resources may be accessed to provide the color management.

RIP firmware 190 may have a software version or other identification associated with it that distinguishes this version from others in system 100. DFE system 106 may implement several different RIP firmware versions depending on the type of print job 103. Further, different printing devices may implement different versions of the RIP firmware. Preferably, RIP firmware 190 is software implemented.

The disclosed embodiments also may determine dot count value 309 from the rendered image provided by renderer 308. Dot count values may be adjusted based on screening 312 and based on settings at the selected printing device, as provided via the corresponding printing connectivity module. Dot count value 309 may be used by DFE system 106 to provide ink use estimates and other information.

The rendered document, or bitmap 314, may be sent, for example, to print engine 260 via application module 114. Bitmap 314 is in a file format acceptable for the selected printing device. DFE system 106 may apply a formula to dot count value 309 along with applicable settings to determine consumable use. Further, the disclosed embodiments may use this information to use a single consumable use estimate with a variety of job settings, DFE configuration settings, or printing device configuration settings. Dot count value 309 should not change once determined from the rendered document from RIP firmware 190. Engine specific settings, such as halftones, however, will impact consumable use at print engine 260, and may differ over time at printing device A 104 or at another printing device within system 100.

RIP firmware 190 may be one of several RIPs implemented by DFE system 106. As different printing devices may implement different RIPs, DFE system 106 stores all associated RIPs to make them available for these processing operations. The printing connectivity modules may retrieve RIP versions from the connected printing devices. DFE system 106 also may retrieve color printing resources, such as TRCs, ICC profiles, and associated settings used for color printing at the respective printing device.

Figure 4:
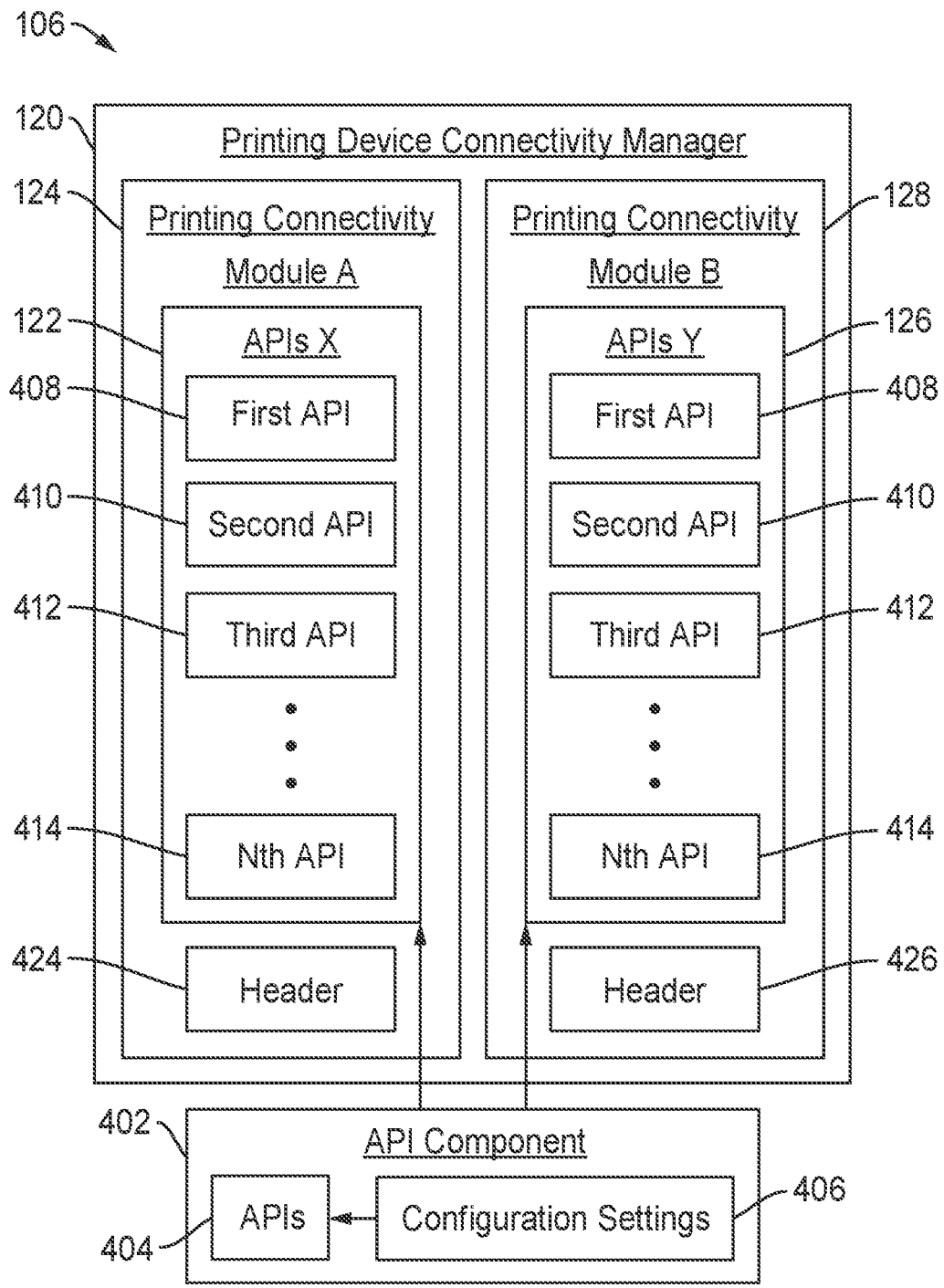
FIG. 4 illustrates a block diagram showing APIs being used to create printing connectivity modules within the printing device connectivity manager according to the disclosed embodiments.

FIG. 4 depicts a block diagram showing APIs being used to create printing connectivity modules within printing device connectivity manager 120 according to the disclosed embodiments. As disclosed above, a printing connectivity module uses the APIs defined in API component 402 to implement pre-defined or standard interface functions for handling, managing, and transmitting print jobs 103 to a selected printing device. API component 402 is a separate component having a plurality of APIs 404. API component 402 may be within printing device connectivity manager 120. Alternatively, API component 402 may be within DFE system 106.

Each printing connectivity module implements and provides the APIs identified in API component 402. This action may be performed when a printing connectivity module is created within printing device connectivity manager 120. The printing connectivity module includes a dynamic link library or module that is loaded at run-time in DFE system 106. The DLL may contain code and data that is used by more than one printing connectivity module at the same time. This feature promotes API reuse and efficient memory usage.

For example, when printing connectivity module A 124 is created, it will load APIs X 122 from API component 402. A plurality of APIs may be loaded to printing connectivity module A 124. Thus, printing connectivity module A 124 implements first API 408, second API 410, third API 412, up to Nth API 414. Printing connectivity module B 128 also loads APIs Y 126 using the same process. Thus, printing connectivity module B 128 implements first API 408, second API 410, third API 412, up to Nth API 414 as well. As disclosed above, any number of APIs may be implemented by the printing connectivity modules.

In some embodiments, configuration settings 406 of the different printing devices may be stored at DFE system 106. Configuration settings 406 may be used to provide additional data along with the APIs provided to the specific printing connectivity modules to tailor the APIs to the printing device. Alternatively, configuration settings 406 may be provided to each printing connectivity module based on which printing device is connected thereto.

Each printing connectivity module may include a header file to facilitate integration of the module within DFE module 106. The header file may be a file that contains function declarations and macro definitions to be shared between several source files. Thus, printing connectivity module A 124 may include header file 424 and printing connectivity module B 128 may include header file 426. In some embodiments, the printing connectivity module may not need to have a header file as the printing connectivity module may be installed into printing device connectivity manager 120 using standard installer programs.

Figure 5:
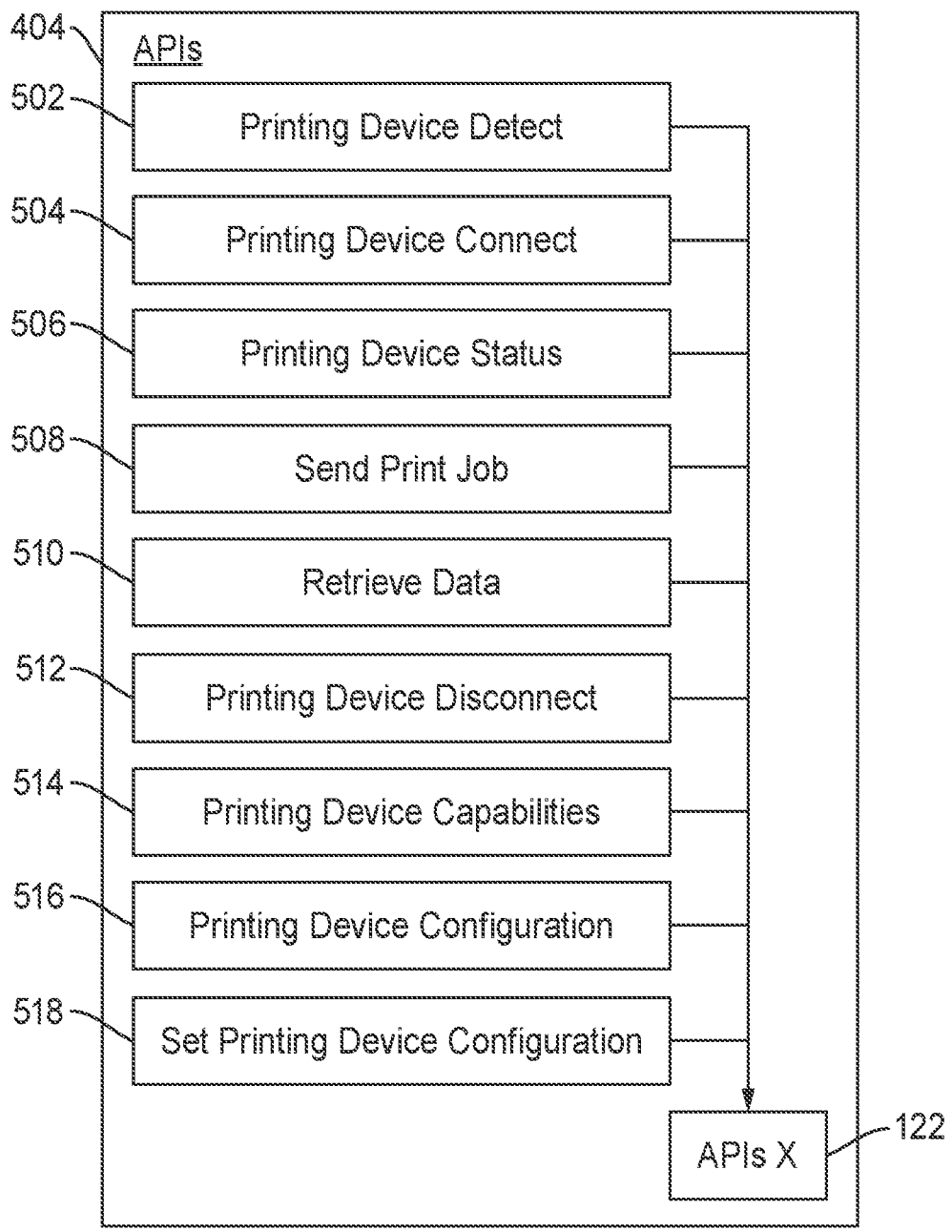
FIG. 5 illustrates a block diagram of a plurality of APIs for use within printing connectivity modules according to the disclosed embodiments.

FIG. 5 depicts a block diagram of a plurality of APIs 404 for use within printing connectivity modules according to the disclosed embodiments. As disclosed above, printing connectivity APIs are implemented by the printing connectivity modules to provide the functionality in communicating with the printing devices connected with DFE system 106. APIs 404 may include pre-defined APIs that abstracts printing device communication and printing support for DFE system 106.

An application programming interface (API) provides the means for two or more computer programs, such as printing connectivity module A 124 and application module 112 of printing device A 104, to communicate with each other. Thus, APIs 404 connect DFE system 106 to the printing devices within printing system 100. An API specification may define how the APIs are to be used by the printing connectivity modules.

Referring to FIG. 5, examples of interface functions are disclosed. Other interfaces may be defined, identified, or added to APIs 404, as needed. Further, the data exchanged through APIs 404 may vary in format, as necessary, such as XJDF, XML, PDL (PCL5, PCL6, PDF, PostScript, Prescribe, and the like), PJL, and the like. DFE system 106 may add or remove an API from APIs 404 as needed to update the capabilities of the DFE system. This feature alleviates the need to update the software of DFE system 106.

Printing device detect API 502 may allow DFE system 106 to detect whether a printing device is connected or on-line within printing system 100. When implemented within a printing connectivity module, printing device detect API 502 may detect whether the connected printing device is connected or on-line. For example, printing connectivity module A 124 may use printing device detect API 502 to detect whether printing device A 104 is connected with DFE system 106.

Printing device connect API 504 allows DFE system 106 to establish a connection session with a printing device. When implemented within a printing connectivity module, printing device connect API 504 may establish a connection session between the printing connectivity module and the corresponding printing device, such as through the application module. For example, printing connectivity module A 124 may use printing device connect API 504 to establish a connection session with printing device A 104.

Printing device status API 506 allows DFE system 106 to detect or retrieve printing device status. When implemented within a printing connectivity module, printing device status API 506 detects and retrieves status for the connecting printing device. For example, printing connectivity module A 124 may use printing device status API 506 to detect and retrieve the status of printing device A 104.

Send print job API 508 allows DFE system 106 to send data for print job 103 to the printing device. When implemented within a printing connectivity module, send print job API 508 sends the data and information for print job 103 to a selected printing device. For example, printing connectivity module A 124 may use send print job API 508 to send data for print job 103 to printing device A 104.

Retrieve data API 510 allows DFE system 106 to retrieve data from the printing device. When implemented within a printing connectivity module, retrieve data API 510 retrieves data and information from the selected printing device. For example, printing connectivity module A 124 may use retrieve data API 510 to retrieve data and information from printing device A 104 for use within DFE system 106.

Printing device disconnect API 512 allows DFE system 106 to disconnect from a printing device. When implemented within a printing connectivity module, printing device disconnect API 512 disconnects from the selected printing device. For example, printing connectivity module A 124 may use printing device disconnect API 512 to disconnect from printing device A 104.

Printing device capabilities API 514 allows DFE system 106 to retrieve printing device capabilities or features. When implemented within a printing connectivity module, printing device capabilities API 514 retrieves capabilities and features, as well as functionality, from the selected printing device. For example, printing connectivity module A 124 may use printing device capabilities API 514 to retrieve capabilities and features from printing device A 104 via application module 112.

Printing device configuration API 516 allows DFE system 106 to retrieve configuration information or settings from the printing device. When implemented within a printing connectivity module, printing device configuration API 516 retrieves the configuration information or settings from the selected printing device. For example, printing connectivity module A 124 may use printing device configuration API 516 to retrieve configuration information or settings from printing device A 104.

Set printing device configuration API 518 allows DFE system 106 to make changes or updates to the configuration of the printing device. When implemented within a printing connectivity module, set printing device configuration API 518 allows one to make changes or updates to the configuration of the printing device. For example, printing connectivity module A 124 may use set printing configuration API 518 to make a change or an update to the configuration of the printing device.

These APIs may be used for first API 408, second API 410, third API 412, and so on up to Nth API 414. Other APIs also may be used. Standard APIs that exist without being pre-defined also may be used. As shown in FIG. 5, APIs 404 may be used to implement APIs X 122 for printing connectivity module 124.

Figure 6:
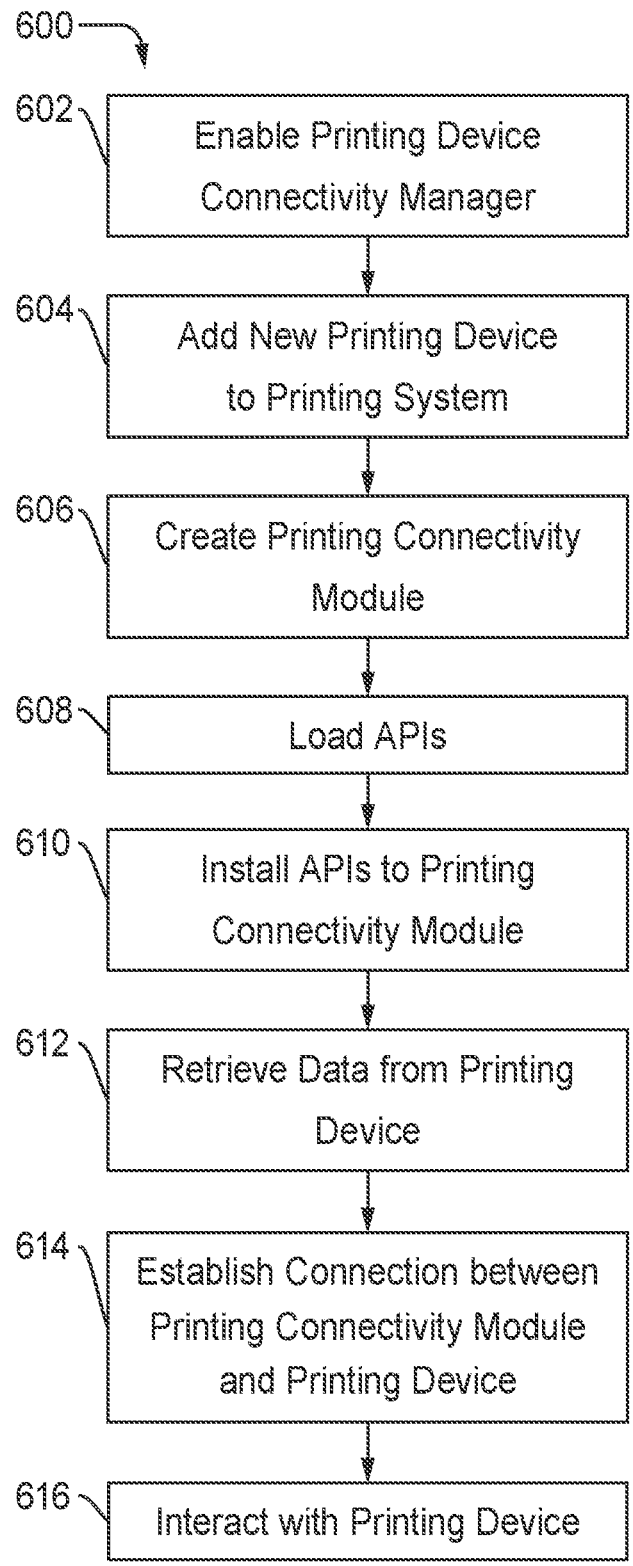
FIG. 6 illustrates a flowchart for creating and implementing a printing connectivity module within a printing device connectivity manager according to the disclosed embodiments.

FIG. 6 depicts a flowchart 600 for creating and implementing a printing connectivity module within printing device connectivity manager 120 according to the disclosed embodiments. Flowchart 600 may refer to FIGS. 1A-5 for illustrative purposes. Flowchart 600, however, is not limited by the embodiments disclosed by FIGS. 1A-5.

Step 602 executes by enabling printing device connectivity manager 120 at DFE system 106. DFE system 106 may install printing device connectivity manager 120 along with API component 402, which includes APIs 404 for use in communicating with printing devices. Printing device connectivity manager 120 allows DFE system 106 to dynamically interact with various devices within printing system 100. This component also maintains and manages the list of printing device connections and identifies the printing connectivity module in which to interact in communicating with a specific printing device.

Step 604 executes by adding a new printing device to printing system 100. The new printing device also connects with DFE system 106. For example, printing device B 108 may be added to printing system 100. Printing device A 104 and printing device D 102 already may be connected to DFE system 106. Step 606 executes by creating printing connectivity module B 128 in printing device connectivity manager 120. Printing connectivity module B 128 may be an installable plug-in component within printing device connectivity manager 120.

Step 608 executes by loading a plurality of APIs at printing device connectivity manager 120 to implement printing connectivity module B 128. The new printing connectivity module may call to API component 402 to retrieve or load APIs Y 126 from APIs 404. Step 610 executes by installing APIs Y 126 at printing connectivity module B 128. APIs Y 126 provide the interfaces within printing connectivity module B 128 to manage, handle, or transmit print job 103 within DFE system 106.

Step 612 executes by retrieving data and information from new printing device B 108. This data and information may include printing device capabilities, such as paper sizes, output tray parameters, color printing capabilities, and the like. Such information also may include model serial number and other device specific information as well as printing device settings. Step 614 executes by establishing connection 144 between printing connectivity module B 128 and printing device B 108. Printing device connectivity manager 120 may update its list of connected devices with this connection. Step 616 executes by interacting with printing device B 108 from DFE system 106 using printing connectivity module B 128. Such an interaction may include converting print job 103 into a translated print job for printing at printing device B 108 and sending the print job to the printing device.

FIG. 7 depicts flowchart 700 for managing workflow using DFE system 106 and printing device connectivity manager 120 according to the disclosed embodiments. Flowchart 700 may refer to FIGS. 1A-6 for illustrative purposes. Flowchart 700, however, is not limited by the embodiments disclosed by FIGS. 1A-6.

Step 702 executes by receiving print job 103 at DFE system 106. Print job 103 may be submitted to printing system 100 for printing at a printing device within the system. Printing system 100 may instruct all print jobs to go to DFE system 106 to manage printing operations. Step 704 executes by detecting a printing device connected to DFE system 106 using printing device connectivity manager 120. For example, DFE system 106 may use printing device connectivity manager 120 to detect printing device A 104. Printing device A 104 is connected to DFE system 106. In some embodiments, an operator may specify which printing device is to receive print job 103 for printing. In other embodiments, DFE system 106 may analyze some attributes or metadata associated with print job 103 to determine which printing device is the best for completing the printing operations.

Step 706 executes by translating print job 103 within DFE system 106. DFE system 106 may use RIP firmware 190, as disclosed above. The translation may include converting print job 103 into a file format, or raster data format, that is acceptable to a selected printing device. The file format may be known for print engine 260 of printing device A 104. Step 708 executes by notifying printing device connectivity manager 120, by DFE system 106, to open communication with printing device A 104.

Step 710 executes by opening communication with printing device A 104 using corresponding printing connectivity module A 124. Printing device connectivity manager 120 determines according to its list or data that printing connectivity module A 124 is connected to printing device A 104 via connection 142. Step 712 executes by communicating with printing device A 104 with printing connectivity module A 124 using APIs X 122. APIs X 122 provide the interfaces to communicate directly with printing device A 104. In some embodiments, printing connectivity module A 124 communicates with application module 112 at printing device A 104.

Step 714 executes by sending translated print job 103 to printing device A 104 using one or more of APIs X 122 within printing connectivity module A 124. Thus, DFE system 106 does not require special software to communicate with printing device A 104. Instead, printing device connectivity manager 120 manages printing operations for DFE system 106.

FIG. 8 depicts a flowchart 800 for managing printing operations within printing system 100 using DFE system 106 according to the disclosed embodiments. Flowchart 800 may refer to FIGS. 1A-7 for illustrative purposes. Flowchart 800, however, is not limited by the embodiments disclosed by FIGS. 1A-7.

Step 802 executes by creating a first printing connectivity module. This step may be disclosed above by flowchart 600. For example, printing connectivity module A 124 is created in printing device connectivity manager 120. Step 804 executes by identifying a first application module at the corresponding printing device to connect with the first printing connectivity module. In this instance, printing connectivity module A 124 identifies application module 112 of printing device A 104 to which to establish connection 142.

Step 806 executes by communicating with the first printing device over the connection between the first printing connectivity module and the first application module. In this instance, printing connectivity module A 124 communicates with application module 112 over connection 142 to interact with printing device A 104. Printing connectivity module A 124 may retrieve data about printing device A 104.

Step 808 executes by creating a second printing connectivity module. This step may be disclosed above by flowchart 600. For example, printing connectivity module B 128 is created in printing device connectivity manager 120. Printing device connectivity manager 120 may keep a list of the printing connectivity modules. Step 810 executes by identifying a second application module at the corresponding printing device to connect with the second printing connectivity module. In this instance, printing connectivity module B identifies application module 114 of printing device B 108 to which to establish connection 144.

Step 812 executes by communicating with the second printing device over the connection between the second printing connectivity module and the second application module. In this instance, printing connectivity module B 128 communicates with application module 114 over connection 144 to interact with printing device B 108. Printing connectivity module B 128 may retrieve data about printing device B 108.

Step 814 executes by receiving print job 103 at DFE system 106. This step is similar to step 702 of flowchart 700 disclosed above. Step 816 executes by translating print job 103 into a file format at DFE system 106. This step is similar to step 706 of flowchart 700 disclosed above. Step 818 executes by selecting a printing device connected to DFE system 106 in which to process and print job 103. As disclosed above, the printing device may be selected by an operator or according to an attribute of print job 103. For example, print job 103 may require color printing operations. Printing device A 104 is selected as it is the only color printing device within printing system 100.

Step 820 executes by determining the printing connectivity module associated with the selected printing device in which to send print job 103 for printing. In the above color printing example, DFE system 106, using printing device connectivity manager 120, determines that printing connectivity module A 124 communicates with printing device A 104. Step 822 executes by sending print job 103 to printing device A 104 via printing connectivity module A 124. Printing connectivity module A 124 uses connection 142 to send print job 103 to printing device A 104.

Step 824 executes by receiving print job 103 at application module 112 from printing connectivity module A 124. Application module 112 may allow the disclosed embodiments to bypass the DFE within printing device A 104. This feature saves processing time and resources at the printing device. Step 826 executes by processing and printing print job 103 at print engine 260. Print engine 260 receives print job 103 from application module 112.

If printing device B is selected, then DFE system 106 would send print job 103 via printing connectivity module B 128 using APIs Y 126 over connection 144 to application module 114. Application module 114 may then provide the translated print job directly to print engine 116 of printing device B 108.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for managing a printing system, the method comprising:
    enabling a printing device connectivity manager at a digital front end (DFE);
    creating a printing connectivity module in the printing device connectivity manager, wherein the printing connectivity module corresponds to a printing device connected to the DFE;
    loading a plurality of application programming interfaces (APIs) at the printing device connectivity manager to implement the printing connectivity module;
    installing the plurality of APIs to the printing connectivity module, wherein the plurality of APIs provides interfaces within the printing connectivity module to manage, handle, or transmit a translated print job within the DFE; and
    interacting with the printing device from the DFE using the printing connectivity module.

2. The method of claim 1, wherein the plurality of APIs includes at least one pre-defined interface.

3. The method of claim 1, further comprising converting a print job into the translated print job using the DFE.

4. The method of claim 3, wherein the DFE includes a raster image processor to convert the print job.

5. The method of claim 1, further comprising communicating with the printing device using the printing connectivity module to provide the translated print job.

6. The method of claim 1, further comprising retrieving printing device capabilities using the printing connectivity module.

7. The method of claim 1, wherein the printing connectivity module includes a dynamic link library (DLL) to provide the plurality of APIs.

8. The method of claim 1, further comprising connecting the printing connectivity module to a direct connection to the DFE.

9. A method for managing workflow within a printing system, the method comprising:
- detecting a printing device connected to a digital front end (DFE) using a printing device connectivity manager at the DFE;
- translating a print job within the DFE to be processed at the printing device;
- notifying, by the DFE, the printing device connectivity manager to open communication with the printing device;
- communicating with the printing device with a printing connectivity module located in the printing device connectivity manager, wherein the printing connectivity module includes a plurality of application programming interfaces (APIs); and
- sending the print job to the printing device using at least one of the plurality of APIs within the printing connectivity module corresponding to the printing device.

10. The method of claim 9, further comprising retrieving data from the printing device to the DFE using the printing connectivity module of the printing device connectivity manager.

11. The method of claim 9, further comprising installing the plurality of APIs to the printing connectivity module.

12. The method of claim 9, wherein sending the print job to the printing device includes sending the print job to a print engine of the printing device.

13. The method of claim 9, wherein the DFE includes a raster image processor.

14. The method of claim 13, wherein translating the print job includes converting the print job into a file format accepted by the printing device using the raster image processor.

15. The method of claim 14, wherein the file format includes a raster data format.

16. A digital front end (DFE) server comprising:
- a processor;
- a memory connected to the processor, the memory storing instructions that, when executed on the processor, configure the DFE to
- detect a printing device connected to the DFE using a printing device connectivity manager;
- translate a print job within the DFE to be processed at the printing device;
- notify the printing device connectivity manager to open communication with the printing device;
- communicate with the printing device with a printing connectivity module located in the printing device connectivity manager, wherein the printing connectivity module includes a plurality of application programming interfaces (APIs); and
- send the print job to the printing device using at least one of the plurality of APIs within the printing connectivity module corresponding to the printing device.

17. The DFE of claim 16, further comprising a raster image processor to convert the print job into a file format specified by the printing connectivity module.

18. The DFE of claim 16, wherein the instructions further configure the DFE to enable the printing device connectivity manager at the DFE;
- create the printing connectivity module in the printing device connectivity manager, wherein the printing connectivity module corresponds to the printing device connected to the DFE; and
- load the plurality of APIs at the printing device connectivity manager to implement the printing connectivity module.

19. The DFE of claim 18, wherein the instructions further configure the DFE to install the plurality of APIs to the printing connectivity module, wherein the plurality of APIs provide interfaces within the printing connectivity module to manage, handle, or transmit the print job.

20. The DFE of claim 19, wherein the instructions further configure the DFE to interact with the printing device from the DFE using the printing connectivity module.

* * * * *